United States Patent
Cross et al.

(10) Patent No.: US 10,277,308 B1
(45) Date of Patent: Apr. 30, 2019

(54) METHODS AND SYSTEMS OF ADAPTIVE ANTENNA POINTING FOR MITIGATING INTERFERENCE WITH A NEARBY SATELLITE

(71) Applicant: VIASAT, INC., Carlsbard, CA (US)

(72) Inventors: Eric L Cross, Alpharetta, GA (US); Samuel C Finney, Atlanta, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 15/687,063

(22) Filed: Aug. 25, 2017

Related U.S. Application Data

(60) Provisional application No. 62/398,031, filed on Sep. 22, 2016.

(51) Int. Cl.
*H04B 7/185* (2006.01)
*H04W 16/28* (2009.01)
(Continued)

(52) U.S. Cl.
CPC ....... *H04B 7/18508* (2013.01); *H04B 7/0617* (2013.01); *H04B 7/1851* (2013.01);
(Continued)

(58) Field of Classification Search
CPC  H04B 7/185; H04B 7/18502; H04B 7/18504; H04B 7/18506; H04B 7/18508; H04B 7/1853
See application file for complete search history.

(56) References Cited

U.S. PATENT DOCUMENTS

| 3,599,495 A | 8/1971 | Brown et al. |
| 4,803,490 A | 2/1989 | Kruger |

(Continued)

FOREIGN PATENT DOCUMENTS

| CA | 1011845 A1 | 6/1977 |
| EP | 1437796 A1 | 7/2004 |

(Continued)

OTHER PUBLICATIONS

Non-Final Office Action mailed in U.S. Appl. No. 14/812,929 dated Dec. 11, 2017, 8 pgs.
(Continued)

*Primary Examiner* — Dong-Chang Shiue
(74) *Attorney, Agent, or Firm* — Holland & Hart LLP

(57) ABSTRACT

Systems and methods are described herein for adaptive pointing operations of a mobile antenna system that can be used to provide communication with a target satellite over a large geographical area, while also satisfying interference requirements with one or more other satellites. In particular, the adaptive pointing operations described herein control pointing of a beam of the antenna system towards the target satellite in a manner that takes into consideration the interference requirements of the other satellites. In some embodiments, the mobile antenna system can provide non-interfering communication with the target satellite, over the entire or substantially the entire coverage area (or footprint) of the target satellite. In doing so, services such as Internet, telephone and/or television services provided by the target satellite can be delivered to users throughout most or all of the satellite's coverage area, while also satisfying interference requirements with other satellites.

16 Claims, 10 Drawing Sheets

(51) Int. Cl.
*H04B 7/06* (2006.01)
*H04W 64/00* (2009.01)
*H04W 16/26* (2009.01)
*H01Q 1/28* (2006.01)

(52) U.S. Cl.
CPC .............. *H01Q 1/28* (2013.01); *H04W 16/26* (2013.01); *H04W 16/28* (2013.01); *H04W 64/003* (2013.01)

(56) References Cited

U.S. PATENT DOCUMENTS

| | | |
|---|---|---|
| 4,939,523 A | 7/1990 | Jehle et al. |
| 6,476,764 B2 | 11/2002 | Fang |
| 6,708,019 B2 | 3/2004 | McLain et al. |
| 6,751,801 B1 | 6/2004 | Frisco et al. |
| 6,943,750 B2 | 9/2005 | Brooker et al. |
| 7,072,634 B2 | 7/2006 | Tillotson |
| 7,136,621 B2 | 11/2006 | De La Chapelle et al. |
| 7,330,151 B1 | 2/2008 | Monk et al. |
| 7,408,898 B1 | 8/2008 | Brown |
| 7,629,935 B2 | 12/2009 | Mansour et al. |
| 7,630,683 B2 | 12/2009 | De La Chapelle |
| 7,768,469 B2 | 8/2010 | Mansour et al. |
| 7,956,806 B2 | 6/2011 | Liu et al. |
| 7,999,750 B2 | 8/2011 | Mansour et al. |
| 8,254,843 B2 | 8/2012 | Tillotson |
| 8,737,925 B2 | 5/2014 | Beeler et al. |
| 9,123,988 B2 | 9/2015 | Irvine |
| 2005/0003864 A1 | 1/2005 | Elliot et al. |
| 2005/0085186 A1 | 4/2005 | Sandrin |
| 2005/0200541 A1 | 9/2005 | Bassily |
| 2009/0022088 A1 | 1/2009 | Wahlberg et al. |
| 2010/0265149 A1 | 10/2010 | Omori et al. |
| 2011/0215985 A1 | 9/2011 | Kaplan et al. |
| 2011/0298672 A1 | 12/2011 | Otto et al. |
| 2012/0200458 A1 | 8/2012 | Jalali et al. |
| 2014/0145887 A1* | 5/2014 | Irvine .................... H01Q 3/08 343/713 |
| 2014/0225767 A1 | 8/2014 | Cordone |
| 2014/0225768 A1 | 8/2014 | Engel et al. |
| 2015/0215029 A1 | 7/2015 | Lemme |
| 2015/0333398 A1 | 11/2015 | Irvine |
| 2015/0365116 A1 | 12/2015 | Henderson et al. |
| 2017/0358851 A1 | 12/2017 | Diamond et al. |
| 2018/0006371 A1* | 1/2018 | Dang .................... H01Q 3/28 |

FOREIGN PATENT DOCUMENTS

| | | |
|---|---|---|
| EP | 2738869 A1 | 6/2014 |
| GB | 295493 A | 5/1996 |

OTHER PUBLICATIONS

Non-Final Office Action mailed in U.S. Appl. No. 15/165,539 dated Dec. 29, 2017, 27 pgs.

Extended European Search Report and Opinion mailed in European Patent Application No. 13195191.5 dated Apr. 7, 2014, 7 pgs.

IGT, "Airborne Satellite COTM", www.iDirectGT.com, Sep. 2012, 9 pgs.

Shroyer, "Satcom-On-The-Move Why One Size Doesn't Fit All", General Dynamics SATCOM Technologies, Military Communications Conference MILCOM, 2012, 6 pgs.

Weerackody et al., "Technical Challenges and Performance of Satellite Communications on-the-Move Systems", http://www.jhuapl.edu/techdigest/TD/td3002/Weerackody.pdf, Johns Hopkins APL Technical Digest, vol. 30, No. 2, 2011, pp. 113-121.

Westall, "Power Spectral Density—More is not Necessarily Better (Part 2)", http://www.satellitetoday.com/publications/2013/11/19/power-spectral-density-more-is-not-necessarily-better-part-2/, Via Satellite, Nov. 19, 2013, 4 pgs.

White Paper, "Adjusting Equivalent Isotropic Radiated Power per Bandwidth as a Function of SKEW Angle for ARINC 791 Antenna Systems", Oct. 24, 2011, 16 pgs.

Notice of Allowance dated Jul. 24, 2018, U.S. Appl. No. 14/812,929; 5 pgs.

* cited by examiner

METHODS AND SYSTEMS OF ADAPTIVE ANTENNA POINTING FOR MITIGATING INTERFERENCE WITH A NEARBY SATELLITE

CROSS-REFERENCE TO RELATED APPLICATIONS

This application claims priority to U.S. Provisional Application No. 62/398,031, titled "Methods and Systems of Adaptive Antenna Pointing for Mitigating Interference with a Nearby Satellite", filed 22 Sep. 2016, which is incorporated by reference herein.

BACKGROUND

The present disclosure relates generally to satellite communications, and more specifically to systems and methods for using such systems to avoid excessive interference with one or more non-target satellites during communication with a target satellite.

An Earth-based antenna terminal for communication with a target satellite typically has high antenna gain and a narrow beam pointed at the satellite, because of the large distance to the satellite and to avoid interference with other (non-target) satellites.

In order to satisfy interference requirements with other satellites, a mobile antenna terminal may only be permitted to communicate with the target satellite while at certain geographic locations. In such a case, services provided by the target satellite are unavailable to users of the mobile antenna terminal while at these locations, even though they are within the coverage area of the target satellite.

SUMMARY

In one embodiment, a method is described that includes pointing a beam of an antenna on a mobile vehicle in a target direction at a target satellite and communicating a signal with the target satellite via the antenna. The beam has an asymmetric beam pattern with a wide beamwidth axis and a narrow beamwidth axis in the target direction. The method further includes determining that an amount of interference in a non-target direction reaches a threshold due to the wide beamwidth axis of the asymmetric beam pattern. The method further includes, in response to the determination, adjusting pointing of the beam to an offset direction away from the non-target direction and further communicating the signal with the target satellite via the antenna.

In another embodiment, an antenna system for mounting on a mobile vehicle is described. The antenna system includes an antenna having a beam for communicating a signal with a target satellite. The beam has an asymmetric beam pattern with a wide beamwidth axis and a narrow beamwidth axis. The antenna system further includes a pointing adjustment mechanism to adjust pointing of the beam of the antenna. The antenna system further includes an adaptive pointing system to control transition of the pointing adjustment mechanism from a first operational mode to a second operational mode in response an amount of interference in a non-target direction reaching a threshold due to the wide beamwidth axis of the asymmetric beam pattern. In the first operational mode, the pointing adjustment mechanism points the beam of the antenna in a target direction at the target satellite. In the second operational mode, the pointing adjustment mechanism adjusts pointing of the beam to an offset direction away from the non-target direction.

Other aspects and advantages of the present disclosure can be seen on review of the drawings, the detailed description, and the claims which follow.

DETAILED DESCRIPTION

Figure 1:
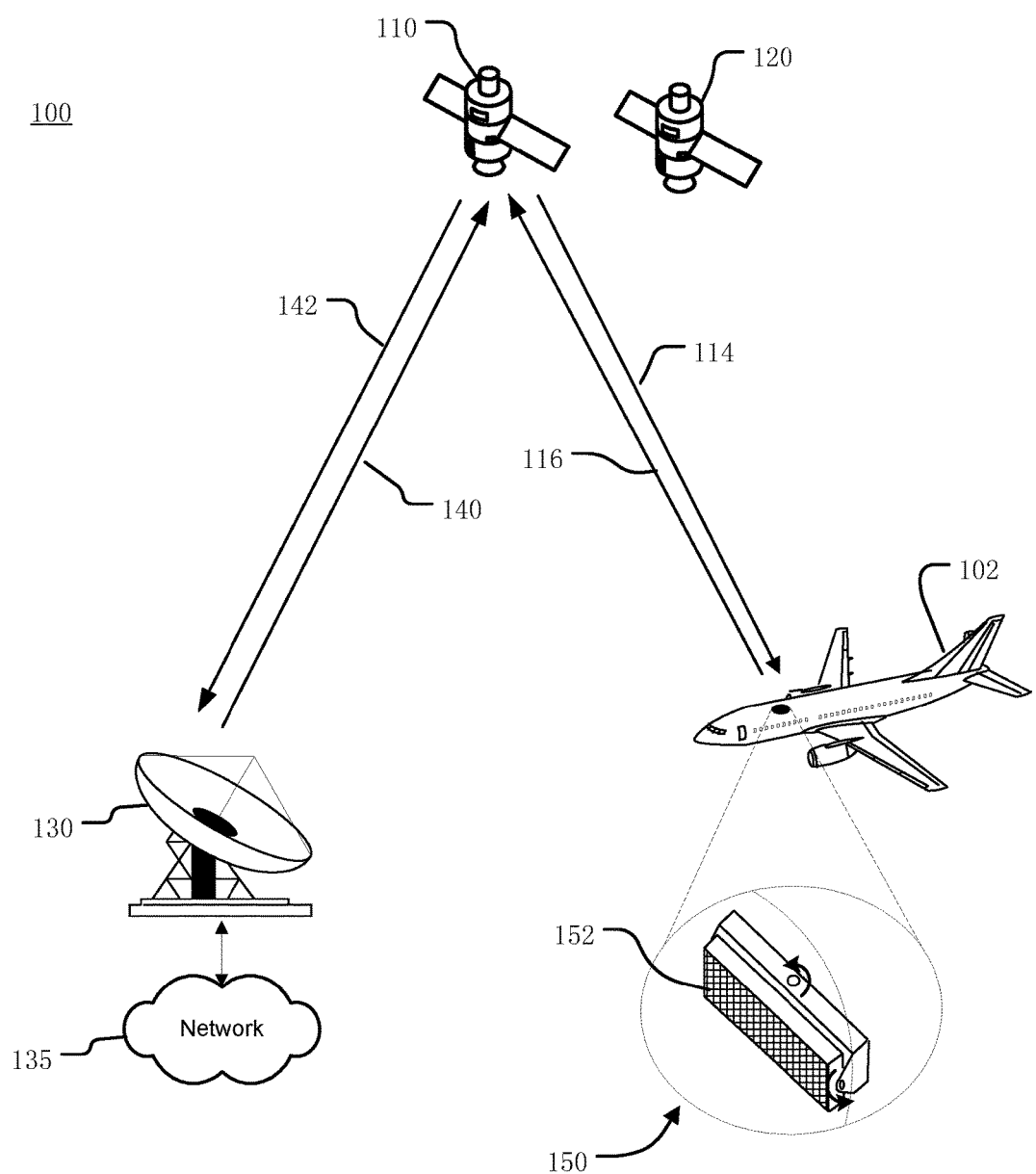
FIG. 1 illustrates an example satellite communications system in which an antenna system as described herein can be used to point towards a target satellite, while also avoiding excessive interference with one or more other satellites.

Systems and methods are described herein for adaptive pointing operations of a mobile antenna system that can be used to provide communication with a target satellite over a large geographical area, while also satisfying interference requirements with one or more other satellites. In particular, the adaptive pointing operations described herein control pointing of a beam of the antenna system towards the target satellite in a manner that takes into consideration the interference requirements of the other satellites. In some embodiments, the mobile antenna system can provide non-interfering communication with the target satellite, over the entire or substantially the entire coverage area (or footprint) of the target satellite. In doing so, services such as Internet, telephone and/or television services provided by the target satellite can be delivered to users throughout most or all of the satellite's coverage area, while also satisfying interference requirements with other satellites.

The antenna system includes an antenna with a beam having an asymmetric beam pattern at some or all of the pointing directions towards the target satellite. The asymmetric beam pattern of the beam of the antenna has a narrow beamwidth axis and a wide beamwidth axis. As described in more detail below, when the antenna system is at certain geographic locations, the wide beamwidth axis of the beam can give rise to excessive interference with one or more other (non-target satellites), if the beam were pointed directly at the target satellite.

The antenna system described herein can avoid the excessive interference that could result due to the wide beamwidth axis of the beam, thereby allowing non-interfering communication with the target satellite over a large geographic area. As described in more detail below, the antenna system includes an adaptive pointing system that controls pointing of the target satellite in a manner that takes into consideration the interference requirements of the other satellites. Using the techniques described herein, the adaptive pointing system can determine when the amount of interference with one or more non-target satellites, due to the wide beamwidth axis, reaches a threshold while directly pointed at the target satellite. In response to the determination, the adaptive pointing system can cause the beam to be pointed in an offset direction away from the non-target satellite. The offset direction is such that the interference requirements with the non-target satellite remain satisfied, while still permitting communication with the target satellite. In doing so, the antenna system described herein can provide communication with the target satellite at locations where directly pointing at the target satellite is precluded due to interference requirements. As a result, the area over which services provided by the target satellite can be delivered to users of the antenna system can be larger than compared to the antenna system only directly pointing at the target satellite.

FIG. 1 illustrates an example satellite communications system 100 in which an antenna system 150 as described herein can be used to point towards satellite 110 (referred to hereinafter as "target satellite 110"), while also avoiding excessive interference with one or more other satellites. Many other configurations are possible having more or fewer components than the satellite communications system 100 of FIG. 1.

In the illustrated embodiment, the antenna system 150 is mounted on aircraft 102, which in this example is an airplane. More generally, the antenna system 150 can be mounted on various types of mobile vehicles such as aircraft (e.g., airplanes, helicopters, drones, blimps, balloons, etc.), trains, automobiles (e.g., cars, trucks, busses, etc.), watercraft (e.g., private boats, commercial shipping vessels, cruise ships, etc.) and others. In the following examples, the techniques described herein for performing adaptive pointing operations are described in conjunction with the aircraft 102. Alternatively, the adaptive pointing operations may be used in conjunction with other mobile vehicles such as those mentioned above. In yet other embodiments, the adaptive pointing operations may be used in conjunction with a nomadic or portable antenna system, such as being associated with a building or structures that are not regularly mobile.

As described in more detail below, the antenna system 150 includes an antenna 152 producing a beam that facilitates communication between the aircraft 102 and the target satellite 110. The beam of the antenna 152 has an asymmetric beam pattern at some or all of the pointing directions towards the target satellite 110. The antenna 152 can be any type of antenna that produces an asymmetric beam pattern, and can vary from embodiment to embodiment.

In some embodiments, the antenna 152 has a non-circular aperture that results in an asymmetric beam pattern at boresight. For example, in the illustrated example of FIG. 1, the antenna 152 is a direct radiating two-dimensional array. In such a case, the beam of the antenna 152 can have an asymmetric beam pattern that does not vary with pointing direction. In other embodiments, the beam has an asymmetric beam pattern at less than all of the pointing directions towards the target satellite. For example, the antenna 152 may be a circularly-shaped two-dimensional array that is a non-movable, fully electronic scanned phased array antenna. In such a case, the beam pattern may be symmetrical at boresight, and become asymmetric when the beam is scanned away from boresight.

The asymmetric beam pattern of the beam of the antenna has a narrow beamwidth axis and a wide beamwidth axis. As described in more detail below, when the antenna system 150 is at certain geographic locations, the wide beamwidth axis can give rise to excessive interference with the non-target satellite 120, if the beam of the antenna 152 were pointed directly at the target satellite 110.

The antenna system 150 also includes a pointing adjustment mechanism such as a mechanical positioner (not shown) responsive to a control signal from an antenna control unit (not shown) to provide pointing of the beam of the antenna 152 towards the target satellite 110 using the techniques described herein. In some embodiments described herein the antenna system 150 is used for bidirectional (two-way) communication with the target satellite 110. In other embodiments, the antenna system 150 may be used for unidirectional communication with the target satellite 110, such as a receive-only implementation (e.g., receiving satellite broadcast television). Although only one antenna system 150 is illustrated in FIG. 1 to avoid over complication of the drawing, the satellite communications system 100 may include many antenna systems 150.

As used herein, a beam of an antenna that is pointed "directly" at a target satellite is pointed such that pointing error (if any) between the boresight direction of maximum gain of the beam and the direction of the target satellite is unintentional or undesired. When pointed directly, the direction of the target satellite may be the boresight direction of maximum gain of the beam. Alternatively, when directly pointed, the gain of the beam in the direction of the target satellite may be less than the maximum gain of the beam. This may for example be due to pointing accuracy limitations of the antenna.

In the illustrated embodiment, the target satellite 110 provides bidirectional communication between the aircraft 102 and a gateway terminal 130. The gateway terminal 130 is sometimes referred to as a hub or ground station. The gateway terminal 130 includes an antenna to transmit a forward uplink signal 140 to the target satellite 110 and receive a return downlink signal 142 from the target satellite 110. The gateway terminal 130 can also schedule traffic to the antenna system 150. Alternatively, the scheduling can be performed in other parts of the satellite communications system 100 (e.g., a core node, or other components, not shown). Signals 140, 142 communicated between the gateway terminal 130 and the target satellite 110 can use the same, overlapping, or different frequencies as signals 114, 116 communicated between the target satellite 110 and the antenna system 150.

Network 135 is interfaced with the gateway terminal 130. The network 135 can be any type of network and can include for example, the Internet, an IP network, an intranet, a wide area network (WAN), a virtual LAN (VLAN), a fiber optic network, a cable network, a public switched telephone network (PSTN), a public switched data network (PSDN), a public land mobile network, and/or any other type of network supporting communication between devices as described herein. The network 135 can include both wired and wireless connections as well as optical links. The network 135 can connect multiple gateway terminals 130 that can be in communication with target satellite 110 and/or with other satellites.

The gateway terminal 130 can be provided as an interface between the network 135 and the target satellite 110. The gateway terminal 130 can be configured to receive data and information directed to the antenna system 150 from a source accessible via the network 135. The gateway terminal 130 can format the data and information and transmit forward uplink signal 140 to the target satellite 110 for delivery to the antenna system 150. Similarly, the gateway terminal 130 can be configured to receive return downlink signal 142 from the target satellite 110 (e.g., containing data and information originating from the antenna system 150) that is directed to a destination accessible via the network 135. The gateway terminal 130 can also format the received return downlink signal 142 for transmission on the network 135.

The target satellite 110 can receive the forward uplink signal 140 from the gateway terminal 130 and transmit corresponding forward downlink signal 114 to the antenna system 150. Similarly, the target satellite 110 can receive return uplink signal 116 from the antenna system 150 and transmit corresponding return downlink signal 142 to the gateway terminal 130. The target satellite 110 can operate in a multiple spot beam mode, transmitting and receiving a number of narrow beams directed to different regions on Earth. Alternatively, the target satellite 110 can operate in wide area coverage beam mode, transmitting one or more wide area coverage beams.

The target satellite 110 can be configured as a "bent pipe" satellite that performs frequency and polarization conversion of the received signals before retransmission of the signals to their destination. As another example, the target satellite 110 can be configured as a regenerative satellite that demodulates and remodulates the received signals before retransmission.

As shown in FIG. 1, the satellite communications system 100 also includes another satellite 120 (hereinafter referred to as "non-target satellite 120"). Communication of one or more signals between the non-target satellite 120 and the antenna system 150 is undesired or unintended. Although only one non-target satellite 120 is illustrated in FIG. 1 to avoid over complication of the drawing, the satellite communications system 100 can include many more non-target satellites 120 and the techniques described herein can be used to avoid excessive interference with each of the non-target satellites 120.

The non-target satellite 120 can, for example, be configured as a bent pipe or regenerative satellite. The non-target satellite 120 can communicate one or more signals with one or more ground stations (not shown) and/or other terminals (not shown).

As mentioned above, the antenna system 150 includes antenna 152 that produces a beam pointed towards the target satellite 110 via the pointing adjustment mechanism to provide for transmission of the return uplink signal 116 and reception of the forward downlink signal 114.

Based on the location of the target satellite 110, the location and attitude (yaw, roll and pitch) of the aircraft 102, and the pointing operational mode controlled by the adaptive pointing system (discussed in more detail below), the antenna control unit of the antenna system 150 provides a control signal to the pointing adjustment mechanism to change the pointing direction of the beam of the antenna 152 to track the target satellite 110 as the aircraft 102 moves.

As described in more detail below, the antenna system 150 also includes an adaptive pointing system (not shown) that controls the pointing of the beam of the antenna 152 towards the target satellite 110 in a manner that takes into consideration the interference requirement of the non-target satellite 120. As a result, the techniques described herein can ensure that the interference generated is within acceptable limits, while at the same time permitting communication between the aircraft 102 and the target satellite 110. The adaptive pointing system and the adaptive pointing operations are described in more detail below with respect to FIG. 2 and others.

As used herein, interference "with" the non-target satellite 120 can refer to uplink interference and/or downlink interference. Uplink interference is interference to the non-target satellite 120 caused by a portion of the return uplink signal 116 transmitted by the antenna system 150 that is received by the non-target satellite 120. Downlink interference is interference to the antenna system 150 caused by a portion of a signal transmitted by the non-target satellite 120 that is received by the antenna system 150.

In the illustrated embodiment, the target satellite 110 and the non-target satellite 120 are each geostationary satellites. The geostationary orbit slots, and thus the angular separation along the geostationary arc between the target satellite 110 and the non-target satellite 120, can vary from embodiment to embodiment. In some embodiments, the angular separation along the geostationary arc is at least two degrees. In alternative embodiments, one or both of the target satellite 110 and the non-target satellite 120 can be a non-geostationary satellite, such as a LEO or MEO satellite.

Figure 2:
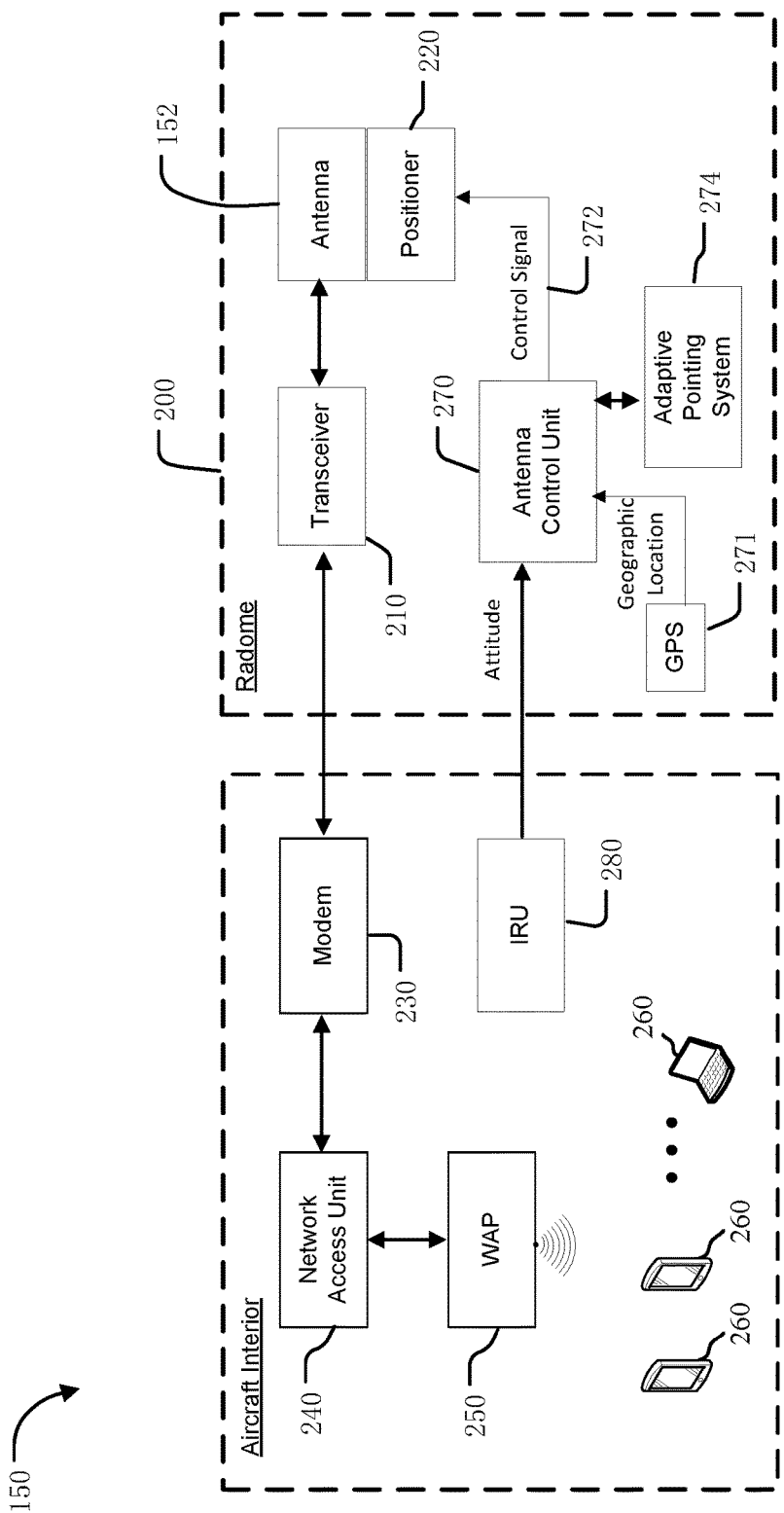
FIG. 2 is a block diagram illustrating an example antenna system on the aircraft of FIG. 1.

FIG. 2 is a block diagram illustrating an example antenna system 150 on the aircraft 102 of FIG. 1. Many other configurations are possible having more or fewer components than the antenna system 150 shown in FIG. 2. Moreover, the functionalities described herein can be distributed among the components in a different manner than described herein.

The antenna system 150 includes antenna 152 that is housed under radome 200 disposed on the top of the fuselage or other location (e.g., on the tail, etc.) of the aircraft 102. The antenna 152 produces a beam that can provide for transmission of the return uplink signal 116 and reception of the forward downlink signal 114 to support two-way data communication between data devices 260 within the aircraft 102 and the network 135 via target satellite 110 and gateway terminal 130. The data devices 260 can include mobile devices (e.g., smartphones, laptops, tablets, netbooks, and the like) such as personal electronic devices (PEDs) brought onto the aircraft 102 by passengers. As further examples, the data devices 260 can include passenger seat back systems or other devices on the aircraft 102. The data devices 260 can communicate with network access unit 340 via a communication link that can be wired or wireless. The communication link can be, for example, part of a local area network such as a wireless local area network (WLAN) supported by wireless access point (WAP) 250. One or more WAPs can be distributed about the aircraft 102, and can, in conjunction with network access unit 240, provide traffic switching or routing functionality. The network access unit 240 can also allow passengers to access one or more servers (not shown) local to the aircraft 102, such as a server that provides in-flight entertainment.

In operation, the network access unit 240 can provide uplink data received from the data devices 260 to modem 230 to generate modulated uplink data (e.g., a transmit IF signal) for delivery to transceiver 210. The transceiver 210 can then upconvert and then amplify the modulated uplink data to generate the return uplink signal 116 for transmission to the target satellite 110 via the antenna 152. Similarly, the transceiver 210 can receive the forward downlink signal 114 from the target satellite 110 via the antenna 152. The transceiver 210 can amplify and then downconvert the forward downlink signal 114 to generate modulated downlink data (e.g., a receive IF signal) for demodulation by the modem 230. The demodulated downlink data from the modem 230 can then be provided to the network access unit 240 for routing to the data devices 260. The modem 230 can be integrated with the network access unit 240, or can be a separate component, in some examples.

In the illustrated embodiment, the transceiver 210 is located outside the fuselage of the aircraft 102 and under the radome 200. Alternatively, the transceiver 210 can be located in a different location, such as within the aircraft interior.

In the illustrated embodiment and subsequent examples, the antenna system 150 includes positioner 220 coupled to the antenna 152. Alternatively, the antenna system 150 may include a different pointing adjustment mechanism that may vary from embodiment to embodiment, and may depend on the antenna type of the antenna 152.

The positioner 220 is responsive to a control signal on line 272 from antenna control unit 270 to mechanically point the beam of the antenna 152 in the direction of the target satellite 110 as the aircraft 102 moves. Accordingly, the values of the control signal on line 272 to adjust the angular position of the beam depend on the manner in which the positioner 220 (or other pointing adjustment mechanism) is controlled, and can vary from embodiment to embodiment. Although only a single line 272 and a single control signal are shown in FIG. 2, as used herein "control signal" can include one or more separate control signals provided by the antenna control unit 270 to the positioner 220 (or other pointing adjustment mechanism), which in turn may be provided on one or more lines. For example, in some embodiments in which the pointing adjustment mechanism adjusts the angular position of the beam in multiple axes (e.g., azimuth and elevation), the control signal includes a control signal indicating the angular value of each axis.

In some embodiments, the boresight direction of the beam of the antenna 152 is fixed relative to the aperture of the antenna 152. For example, the antenna 152 may be a direct radiating two-dimensional array which results in boresight being normal to a plane containing the antenna elements of the array. As another example, the antenna 152 may be a reflector antenna. In such a case, the antenna 152 can be fully mechanically steered by the positioner 220 to point the beam at the target satellite 110. For example, the positioner 220 may be an elevation-over-azimuth (EL/AZ), two-axis positioner that provides adjustment in azimuth and elevation. As another example, the positioner 220 may be a three-axis positioner to provide adjustment in azimuth, elevation and skew.

In some embodiments, the antenna 152 is an electromechanically steered array that includes one mechanical scan axis and one electrical scan axis. In such a case, the pointing adjustment mechanism can include a combination of mechanical and electrical scanning mechanisms.

In some embodiments, the antenna 152 is a non-movable, fully electronic scanned phased array antenna. In such a case, the pointing adjustment mechanism can include feed networks and phase controlling devices to properly phase signals communicated with some or all of the antenna elements of the antenna 152 to scan the beam in azimuth and elevation.

As mentioned above, the antenna control unit 270 provides a control signal on line 272 to positioner 220 to point the beam of the antenna 152. The functions of the antenna control unit 270 can be implemented in hardware, instructions embodied in memory and formatted to be executed by one or more general or application specific processors, firmware, or any combination thereof.

As shown in FIG. 2, the antenna system 150 also includes adaptive pointing system 274 that controls the pointing operations of the beam of the antenna 152 at the target satellite 110 in a manner that takes into consideration the interference requirement of the non-target satellite 120. In particular, the adaptive pointing system 274 controls transitioning between a direct pointing operational mode and an offset pointing operational mode. The direct pointing operational mode (referred to hereinafter as a "first operational mode") can be used at geographic locations of the antenna system 150 (and thus aircraft 102) where pointing directly at the target satellite 110 does not give rise to excessive interference with the non-target satellite 120. When the antenna system 150 (and thus the aircraft 102) is at certain geographic locations, directly pointing the beam at the target satellite 110 is such that the antenna system 150 still satisfies interference requirement with the non-target satellite 120. In other words, at these certain geographic locations, the interference due to the wide bandwidth axis of the beam is within acceptable limits (i.e., below a threshold) of the non-target satellite 120. These certain geographic locations are referred to herein as an "acceptable geographic area" for using the first operational mode. The geographic locations that are within the acceptable geographic area, and whether it is continuous or discontinuous, can vary from embodiment to embodiment depending on various factors described below. Outside of the acceptable geographic area, the use of the first operational mode is precluded due to the interference requirement.

As the aircraft 102 moves around, the adaptive pointing system 274 can switch to the offset pointing operational mode (referred to hereinafter as a "second operational mode") when the amount of interference with the non-target satellite 120, due to the wide beamwidth axis of the beam, reaches a threshold. In the offset pointing operational mode, the beam is pointed in an offset direction away from the non-target satellite 120, such that the interference requirement is satisfied while still permitting communication with the target satellite 110. As a result, the techniques described herein can ensure that the interference generated is within acceptable limits, while at the same time permitting communication between the aircraft 102 and the target satellite 110. In addition to operating in the offset pointing operational mode, the adaptive pointing system 274 can also change the transmission parameters of the return uplink signal 116 to avoid excessive interference when needed. For example, the adaptive pointing system 274 can send commands to the transceiver 210 to change the transmitted power level of the return uplink signal, send commands to the modem 230 to spread the return uplink signal over a larger bandwidth, or any other technique for reducing the power spectral density in the direction of the non-target satellite 120.

The functions of the adaptive pointing system 274 can be implemented in hardware, instructions embodied in a memory and formatted to be executed by one or more general or application-specific processors, firmware, or any combination thereof. In the illustrated embodiment, the adaptive pointing system 274 is shown as a separate device. Alternatively, some or all of the components or features of the adaptive pointing system 274 can be implemented without one or more other components of the antenna system 150. In the illustrated embodiment, the adaptive pointing system 274 is located under the radome 200. Alternatively, some or all of the adaptive pointing system 274 can be located in a different location, such as within the aircraft interior. As another example, some or all of the adaptive pointing system 274 may be located in other parts of the satellite communications system 100, such as the gateway terminal 130, a core node, a network operations center, or other components not shown.

The adaptive pointing system 274 can control transitioning between the first operational mode and the second operational mode based on one or more thresholds for the amount of interference with the non-target satellite 120. The one or more thresholds can be based on uplink interference and/or downlink interference and can vary from embodiment to embodiment.

In some embodiments, the same threshold can be used for transitioning from the first operational mode to the second operational mode, and for transitioning from the second operational mode to the first operational mode. In other words, the adaptive pointing system 274 can control transition from the first operational mode to the second operational mode when the amount of interference reaches the threshold, and then control transition back to the first operational mode when the amount of interference using the first operational mode will be below the threshold. In some other embodiments, the threshold for transitioning from the first operational mode to the second operational mode can be different than the threshold for switching from the second operational mode to the first operational mode. In such a case, the adaptive pointing system 274 can avoid rapidly switching between the two operational modes when the aircraft 102 is near the boundary of the acceptable geographic area for using the first operational mode.

In some embodiments, the value(s) of the threshold(s) for transitioning between the first and second operational modes can for example be based on regulatory requirements imposed by regulatory agencies (e.g., FCC, ITU, etc.) on the maximum power spectral density (or other metric) that can be radiated to the non-target satellite 120, or coordination agreements with the operator of the non-target satellite 120. Additionally, the threshold(s) can take into account motion induced pointing accuracy limitations of the antenna 152, etc.

The adaptive pointing system 274 can determine when to transition based on a comparison(s) of the threshold(s) to the amount of interference with the non-target satellite 120 at the current geographic location and attitude of the aircraft 102. The geographic location of the aircraft 102 may for example be obtained via a global positioning system (GPS) 271 or other equipment on the aircraft 102. The attitude of the aircraft 102 may for example be provided via an inertial reference unit (IRU) 380 on the aircraft 102.

The amount of interference at a given geographic location can be determined using various techniques, and can be characterized or represented in different ways. For example, in some embodiments the amount of interference is represented in terms of power spectral density (PSD).

The amount of uplink interference can for example be determined based one or more of the known antenna pattern characteristics of the antenna 152, the transmission parameters (e.g., transmit power, frequency range, etc.) of the return uplink signal 116, the geographic location of the aircraft 102, the attitude of the aircraft 102, the locations of the target satellite 110 and non-target satellite 120, the operating frequency, system gain-to-noise temperature (G/T) and/or polarization of operation of the non-target satellite 120, etc. Alternatively, other and/or additional information can be used to calculate the amount of interference. The amount of downlink interference can be calculated in a similar manner based on the parameters of a signal from the non-target satellite 120 that is received by the antenna system 150.

In some embodiments, the comparison of the threshold amount of interference to the amount of interference at the various geographic locations if using the first operational mode has been previously calculated. In such a case, the adaptive pointing system 274 (or other component) can store a look-up table indicating whether or not using the first operational mode is permitted at each the various geographic locations.

In embodiments in which one or both of the target satellite 110 and the non-target satellite 120 are non-geostationary satellites, the acceptable geographic area may change over time depending on the current locations of the target satellite 110 and the non-target satellite 120. For example, at a first time, the effective angular separation between the target satellite 110 and the non-target satellite 120 as viewed at a particular geographic location may be small enough that the interference using the first operational mode would exceed the threshold. However, at a second time, due to the movement of the target satellite 110 relative to the non-target satellite 120, the effective angular separation as viewed at that particular geographic location may be large enough that the first operational mode can be used while still satisfying the interference requirement. In such a case, the look-up table may include the various possible locations of the target satellite 110 and/or the non-target satellite 120. The adaptive pointing system 274 may determine whether or not performing the first mispointing correction operation is permitted based on the current locations of the target satellite 110 and/or the non-target satellite 120.

The manner in which the adaptive pointing system 274 controls the transition between the first and second operational modes can vary from embodiment to embodiment. In some embodiments, the adaptive pointing system 274 provides an offset vector to the antenna control unit 270 indicating the magnitude and direction to adjust pointing of the beam away from the non-target satellite 120. The offset vector indicates the direction and amount (e.g., the angular position in the coordinate system of the antenna system 150) to change the pointing of the beam at a certain geographic location, relative to a target direction for directly pointing at the target satellite 110, in order to satisfy the interference requirement. The summation of the offset vector and the target direction at the target satellite 110, is referred to herein as an offset direction. The offset vector for each of the various geographic locations of the aircraft 102 can be pre-computed and stored in the look-up table by the adaptive pointing system 274. The offset vector may be pre-computed by the adaptive pointing system 274 directly, or pre-computed by one or more other elements of the satellite communication system 100 (e.g., the gateway terminal 130, a core node, a network operations center or NOC, etc.) and then provided to the adaptive pointing system 274 for storage. The appropriate magnitude and direction of the offset vector at each geographic location in order to satisfy the interference requirement can be calculated based on various factors such as those discussed above with respect to determining the amount of interference. Alternatively, the manner in which to adjust pointing of the beam away from the non-target satellite 120 may be represented and performed in other ways.

The location of the offset direction relative to the location of the non-target satellite 120 can vary from embodiment to embodiment. In some embodiments, the offset direction is directly opposite the non-target satellite 120, relative to the target direction for directly pointing at the target satellite 110. That is, the offset direction and the direction of the non-target satellite 120 are, when projected onto a plane perpendicular to the target direction, directly opposite (i.e., rotated 180 degrees) from each other relative to the target direction. In other words, a line within the plane and extending between the offset direction of the direction of the non-target satellite 120, intersects the target direction. In other embodiments, the offset direction is not directly opposite the non-target satellite 120. For example, in embodiments in which there are non-target satellites 120 on both sides of the target satellite 110, the offset direction may be perpendicular to a line defined by the non-target satellites 120. In some embodiments, non-target satellites 120 may be unevenly distributed on both sides of the target satellite 110, such that the absolute value of the respective angular separations from the target satellite 110 are not equal. For example, one non-target satellite 120 may be offset +2 degrees longitude from the target satellite 110 along the geostationary arc, while another non-target satellite 120 is offset −4 degrees longitude from the target satellite 110 along the geostationary arc. In such a case, the offset direction may be towards the non-target satellite 120 having the larger angular separation from the target satellite 110, in order to reduce the amount of interference with the closer non-target satellite 120. As mentioned above, the transmission parameters of the return uplink signal 116 may also be changed to avoid excessive interference when needed.

The adaptive pointing system 274 can then use the current geographic location and attitude of the aircraft 102 to retrieve the appropriate offset vector from the look-up table. In geographic locations within the acceptable geographic area for using the first operational mode, the value of the offset vector may be null or zero, such that the antenna control unit causes the pointing adjustment mechanism to directly point the beam in the target direction at the target satellite 110 when the aircraft 102 is within the acceptable geographic area. In such a case, the transition between the first and second operational modes is controlled by the adaptive pointing system 274 based on the offset vector that is provided to the antenna control unit 270. Alternatively, other techniques may be used to control transition between the first and second operational modes.

The look-up table may be updated from time to time to reflect changes in one or more non-target satellites 120. The changes may include new non-target satellites that come into service, changes in the operation (e.g., footprint, operating frequency, operating polarization, changes in orbital position), etc. In embodiments in which the look-up table is pre-computed by the adaptive pointing system 274 directly, data indicating these changes may be provided to the adaptive pointing system 274 such that the look-up table can be updated. In embodiments in which the look-up table is pre-computed by another element of the satellite communications system 100, that element can update the look-up table and then provide it to adaptive pointing system 274 for use (e.g., via the forward downlink signal 114).

During operation, as the aircraft 102 moves relative to the target satellite 110, the antenna control unit 270 provides the control signal on line 272 to positioner 220 to point the beam of the antenna 152 in the appropriate direction towards the target satellite 110. The antenna control unit 270 may determine the appropriate direction based on the location of the target satellite 110, the location of the aircraft 102, the attitude (including yaw, roll, and pitch) of the aircraft 102, and the offset vector provided by the adaptive pointing system 274. The antenna control unit 270 may for example store (or otherwise obtain) data indicating the location of the target satellite 110. The geographic location of the aircraft 102 may for example be obtained via a global positioning system (GPS) 271 or other equipment on the aircraft 102. The attitude of the aircraft 102 may for example be provided via an inertial reference unit (IRU) 380 on the aircraft 102.

Figure 3:
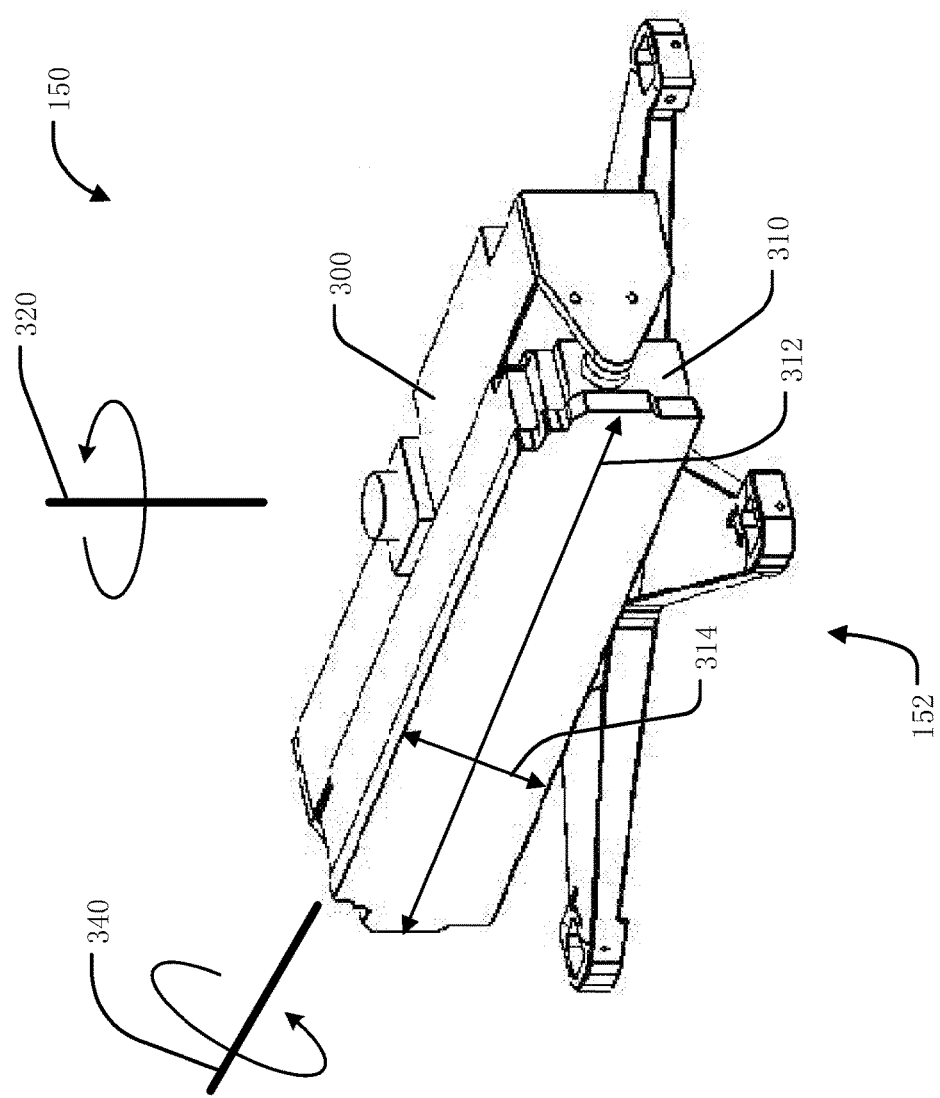
FIG. 3 illustrates a perspective view of an example of an antenna and positioner of an example antenna system described herein.

FIG. 3 illustrates a perspective view of an example of antenna 152 and positioner 220 of antenna system 150. In the illustrated embodiment, the antenna 152 includes an array 310 of antenna elements that is a direct radiating two-dimensional array which results in boresight being normal to a plane containing the antenna elements of the array 310. Alternatively, the array 310 of antenna elements can be arranged or fed in a different manner such that boresight is not normal to the plane containing the antenna elements of the array 310. As mentioned above, in other embodiments the antenna type of the antenna 152 may be different.

In the illustrated embodiment, the array 310 has a non-circular aperture that includes a major axis 312 (referred to hereinafter as "horizontal axis 312"), which is the longest line through the center of the array 310 of antenna elements. The array 310 of antenna elements also includes a minor axis (referred to hereinafter as "vertical axis 314"), which is the shortest line through the center of the array 310 of antenna elements. The non-circular aperture of the array 310 of antenna elements defines a beam having an asymmetric beam pattern at boresight.

As mentioned above, in the illustrated embodiment the boresight direction of maximum gain is normal to a plane containing the antenna elements of the array 310. As a result, in the illustrated embodiment the asymmetric beam pattern has a narrow beamwidth axis aligned with the horizontal axis 312 and a wide beamwidth axis aligned with the vertical axis 314. Alternatively, the array 310 of antenna elements can be arranged and/or fed such that boresight is not normal to the plane containing the antenna elements of the array 310.

The positioner 220 is responsive to control signal provided by the antenna control unit 270 (see FIG. 2) to point the beam of the antenna 152 using the techniques described herein. In the illustrated embodiment, the positioner 220 is an elevation-over-azimuth (EL/AZ) two-axis positioner that provides full two-axis mechanical steering. The positioner 220 includes a mechanical azimuth adjustment mechanism to move the beam of the antenna 152 is azimuth 320, and a mechanical elevation adjustment mechanism to move the beam of the antenna 152 is elevation 340. Each of the mechanical adjustment mechanisms can for example include a motor with gears and other elements to provide for movement of the antenna 152 around a corresponding axis. As mentioned above, in other embodiments the pointing adjustment mechanism used to point the beam of the antenna 152 may be different than positioner 220.

Figure 4A:
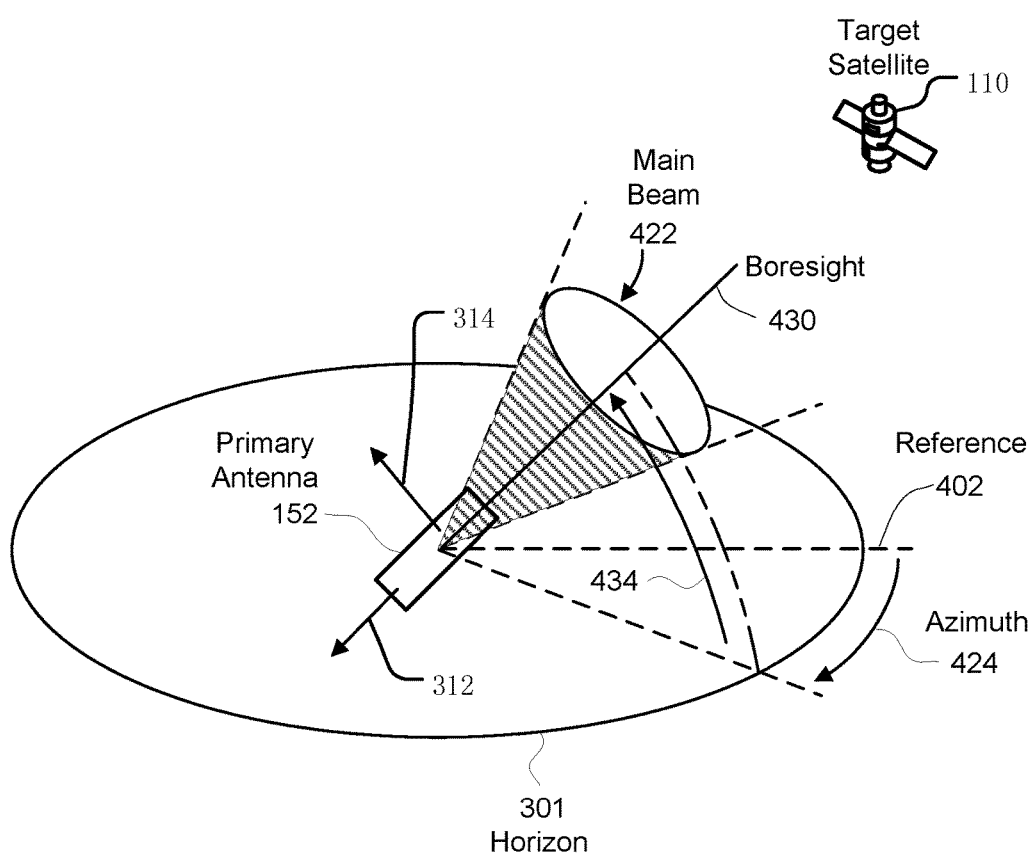
FIG. 4A illustrates a perspective view of the beam of an example asymmetric beam pattern of an example antenna.

FIG. 4A illustrates a perspective view of the beam 422 of an example asymmetric beam pattern of an example antenna 152. The beam 422 has a 3-dB (half-power) contour with an elliptical shape about boresight 430. The positioner 300 (FIG. 3) or other pointing adjustment mechanism can move the antenna 152 to point the boresight 430 of the beam towards the target satellite 110. The direction can be described in terms of azimuth 424 and elevation 434. Azimuth refers to the angle between boresight 430 and reference 402, and elevation 434 refers to the angle between boresight 430 and horizon 401.

Figure 4B:
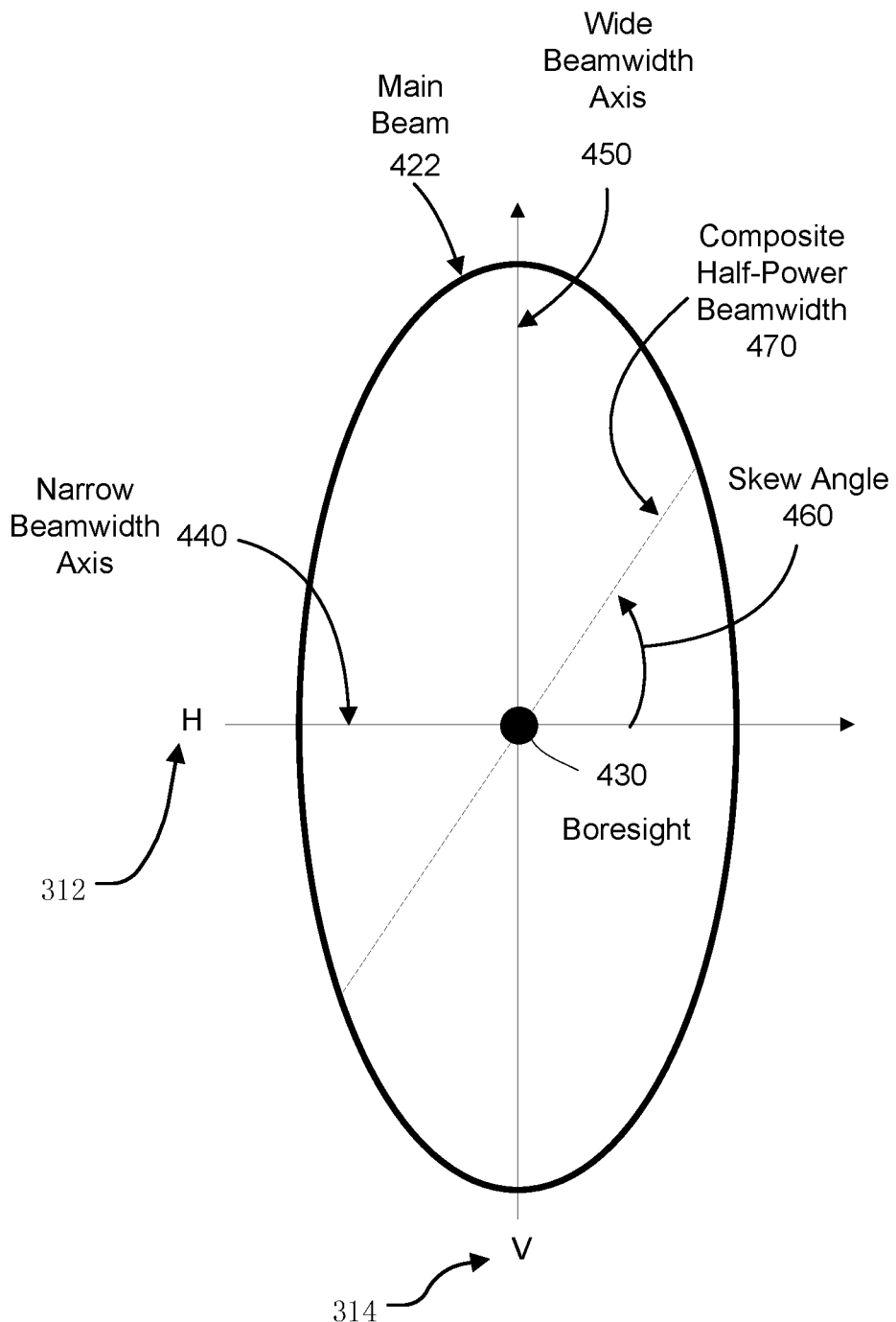
FIG. 4B illustrates an example half-power contour of the asymmetric beam pattern of beam of FIG. 4A.

FIG. 4B illustrates an example half-power contour of the asymmetric beam pattern of beam 422 of FIG. 4A. The beam 422 has a first half-power beamwidth (hereinafter referred to as "horizontal half-power beamwidth") along the narrow beamwidth axis 440 that corresponds to the horizontal axis 312 of the antenna 152, and a second half-power beamwidth (hereinafter referred to as "vertical half-power beamwidth") along the wide beamwidth axis 450 corresponding to the vertical axis 314 of the antenna 152. The horizontal half-power beamwidth and the vertical half-power beamwidth can vary from embodiment to embodiment. In some embodiments, the vertical half-power beamwidth is at least three times greater than the horizontal half-power beamwidth, such as being four times greater. For example, in some embodiments the vertical half-power beamwidth can be less than three degrees, such as being at least four times greater. For example, in some embodiments the vertical half-power beamwidth can be less than three degrees, and the horizontal half-power beamwidth can be less than one degree. Alternatively, the vertical half-power beamwidth and the horizontal half-power beamwidth may be different than the examples above.

As shown in FIG. 4B, the beam 422 has a skew angle 460. As used herein, "skew angle" refers to the angle between the narrow beamwidth axis of the beam of an antenna (e.g., narrow beamwidth axis 440 of the beam 422), and a line defined by the target satellite 110 and the non-target satellite 120. The half-power beamwidth of the beam 422 along the line defined by the target satellite 110 and the non-target satellite 120 is referred to herein as a "composite half-power beamwidth" 470. The composite half-power beamwidth 470 is a mixture of the half-power beamwidths along the narrow beamwidth axis 440 and the wide beamwidth axis 450 respectively, and depends on the skew angle 460. For example, in embodiments in which the target satellite 110 and the non-target satellite 120 are geostationary satellites along the geostationary arc, the skew angle 460 is the angle between the narrow beamwidth axis 440 and the geostationary arc, and the composite half-power beamwidth 470 is the beamwidth along the geostationary arc.

The skew angle 460, and thus the composite half-power beamwidth 470, varies depending upon the geographic location of the antenna system 150 (and thus aircraft 102). For example, if the antenna system 150 is located at the same longitude as the target satellite 110, the skew angle 460 is zero degrees and the composite half-power beamwidth 470 is the horizontal half-power beamwidth along the narrow beamwidth axis 440. In such a case, the composite half-power beamwidth 470 can be narrow enough to satisfy interference requirement with the non-target satellite 120 while in the first operational mode of directly pointing the beam 422 at the target satellite 110.

However, if the antenna system 150 is located at a different longitude than the target satellite 110, the skew angle 460 is non-zero and the composite half-power beamwidth 470 is a mixture of the vertical half-power beamwidth and the horizontal half-power beamwidth. As a result, at certain geographic locations, the composite half-power beamwidth 470 can be wide enough to cause excessive interference with the non-target satellite 120, if the beam 422 were directly pointed at the target satellite 110 using the first operational mode. In other words, due to the vertical half-power beamwidth along the wide beamwidth axis 450, at certain geographic locations within the service area of the target satellite 110, the interference level could exceed the threshold amount of interference with the non-target satellite 120 if the beam 422 were directly pointed at the target satellite 110. In such a case, as described herein, the adaptive pointing system 274 causes the antenna system 150 to operate in the second operational mode in which the beam 422 is pointed in an offset direction away from the non-target satellite 120, such that the interference requirement is satisfied while still permitting communication with the target satellite 110.

Figure 5A:
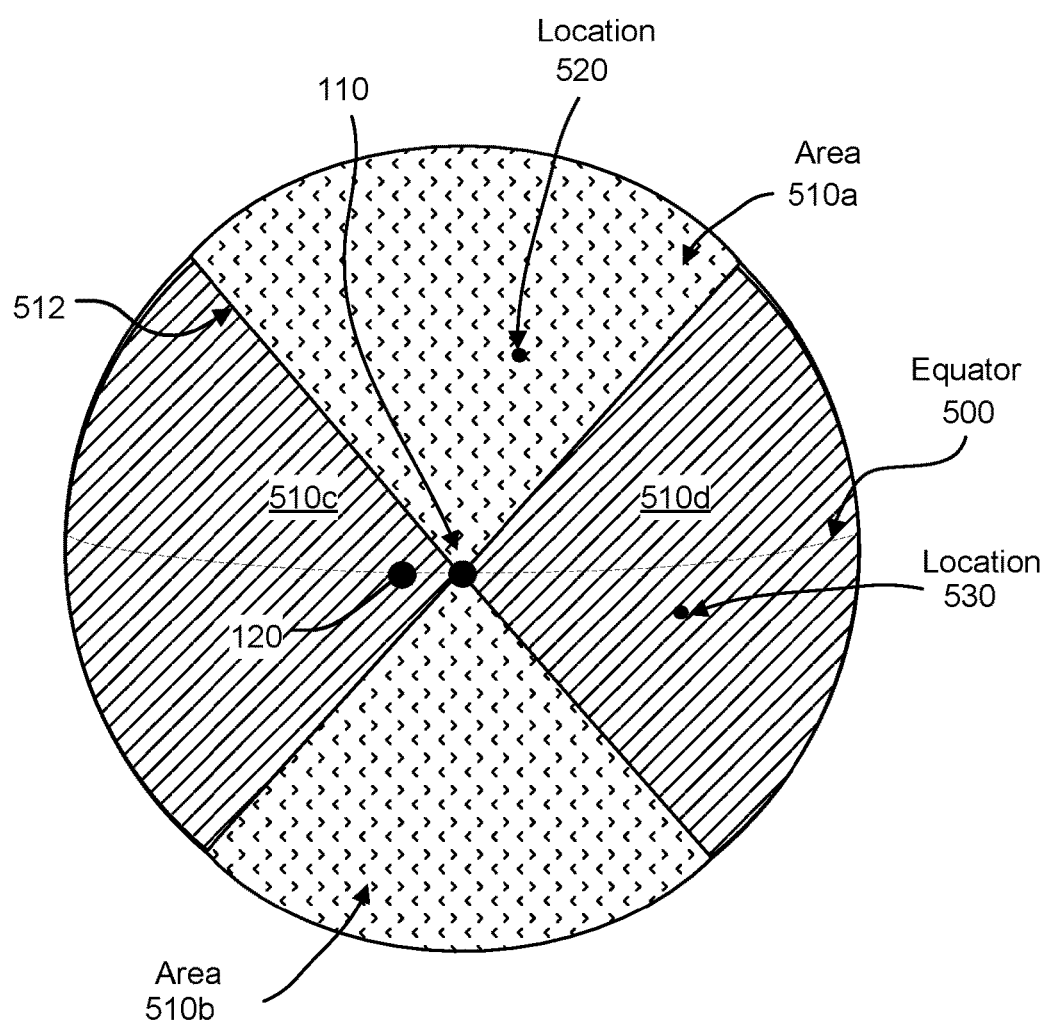
FIG. 5A illustrates an example acceptable geographic areas using the first and second operational modes for pointing the beam at the target satellite.

FIG. 5A illustrates an example acceptable geographic area 510a, 510b for the first operational mode of directly pointing the beam at the target satellite 110. FIG. 5A also illustrates an example acceptable geographic area 510c, 510d for the second operational mode of pointing the beam in an offset direction away from the non-target satellite 120. In the illustrated embodiment, the target satellite 110 and the non-target satellite 120 are both geostationary satellites.

The acceptable geographic area 510a, 510b are geographic locations of the antenna system 150 where the amount of interference with the non-target satellite 120 is at or below the threshold when the beam 422 is directly pointed at the target satellite 110. In other words, within the acceptable geographic area 510a, 510b, the skew angle is less than the maximum acceptable skew angle that satisfies the interference requirement with the non-target satellite 120. The boundary 510 corresponds the maximum acceptable skew angle at which the beam 422 can be directly pointed at the target satellite 110.

The maximum acceptable skew angle, and thus the acceptable geographic area 510a, 510b of the first operational mode, can vary from embodiment to embodiment. The maximum acceptable skew angle can depend on the radiation pattern of the antenna 152, the locations of the target satellite 110 and non-target satellite 120, the threshold amount of interference with the non-target satellite 120, the transmission parameters of the return uplink signal 116, etc.

FIG. 5A also includes example acceptable geographic area 510c, 510d for using the second operational mode when the aircraft 102 is outside the acceptable geographic area 510a, 510b of the first operational mode. The acceptable geographic area 510c, 510d are geographic locations where the amount of interference with the non-target satellite 120 when using the second operational mode is at or below the threshold, and signal communication with the target satellite 110 has acceptable or desired performance characteristics. In the illustrated example, the acceptable geographic area 510c, 510d includes all of the geographic locations outside the acceptable geographic area 510a, 510b of the first operational mode. In other words, the magnitude of the offset needed to satisfy the interference requirement of the non-target satellite 120 during the second operational mode, is such that acceptable signal communication performance can be achieved between the aircraft 102 and the target satellite 110 everywhere outside the acceptable geographic area 510a, 510b of the first operational mode.

In other examples, the acceptable geographic area 510c, 510d does not include all of the geographic locations outside the acceptable geographic area 510a, 510b of the first operational mode. In such a case, the acceptable geographic area 510c, 510d includes a boundary representing the minimum acceptable performance characteristic for signal communication between the aircraft 102 and the target satellite 110 when using the second operational mode. At high scan angle values (e.g., at lower latitudes near the equator 500), the boundary can be due to the increasing magnitude of the offset needed to satisfy the interference requirement of the non-target satellite 120. As a result, at certain geographic locations corresponding to a scan angle value at or above a maximum value (e.g., 85 degrees), the magnitude of the offset needed may preclude signal communication between the aircraft 102 and the target satellite 110 having at least the minimum acceptable performance characteristic.

In some embodiments in which the asymmetric beam pattern of the antenna 152 changes with pointing direction, the boundary of the acceptable geographic area 510c, 510d can also be due to an increase in the composite half-power beamwidth of the beam 422 with pointing direction. For example, in embodiments in which the antenna 152 is an electronically scanned phased array, one or more of the beamwidths of the beam 422 change with scan angle. At low latitudes near the equator 500, the boundary can be due to an increase in the composite half-power beamwidth of the beam 422 at larger scan angles to the target satellite 110.

The minimum acceptable performance characteristic can be represented in various ways, and can vary from embodiment to embodiment. For example, the minimum acceptable performance characteristic can be a minimum acceptable data rate for signal communication between the aircraft 102 and the target satellite 110 that can be achieved for a certain amount of system resource usage (e.g., capacity, bandwidth, etc). As another example, the minimum acceptable performance characteristic can correspond to a maximum acceptable reduction in gain in the direction of the target satellite 110. In other words, as the magnitude of the offset increases, the gain of the beam in the direction of the target satellite 110 decreases. In such a case, the minimum acceptable performance characteristic corresponds to a maximum difference between the boresight direction of maximum gain of the beam and the gain in the direction of the target satellite 110.

The union of the acceptable geographic area 510a, 510b for using the first operational mode and the acceptable geographic area 510c, 510d for using the second operational mode, results in a composite acceptable geographic area for the aircraft 102 to communicate with the target satellite 110. As discussed above, the first operational mode is preferred because it can be used to provide more efficient communication with the target satellite than the second operational mode. However, by operating in the second operational mode, the aircraft 102 is permitted to continue signal communication with the target satellite 110 in geographic locations where use of the first operating mode is precluded due to the interference requirements. As a result, the service area over which services provided by the target satellite 110 can be delivered to users on the aircraft 102 can be larger than compared to only using the first operational mode.

Figure 5B:
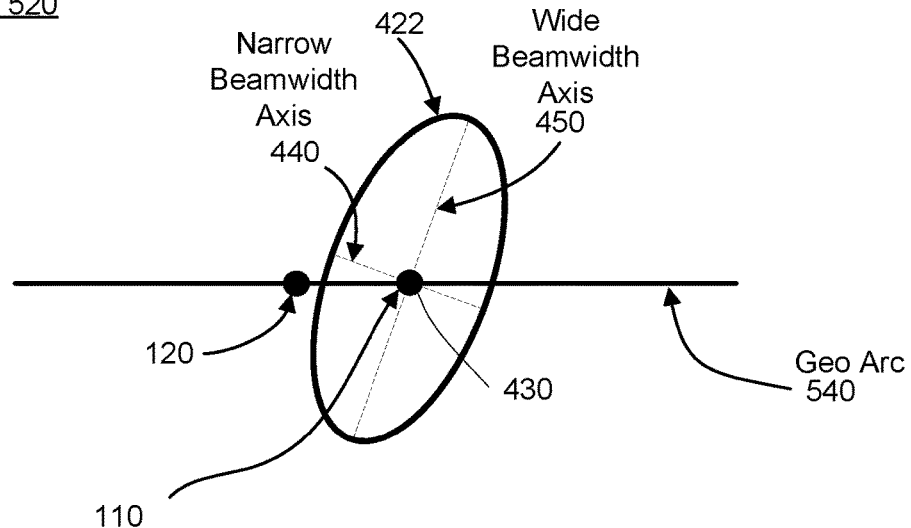
FIG. 5B illustrates pointing of the beam of the antenna for an example geographic location within the acceptable geographic area for using the first operational mode.

FIG. 5B illustrates pointing of the beam 422 of the antenna 152 for an example geographic location 520 within the acceptable geographic area 510a, 510b for using the first operational mode. At this location 520, the composite half-power beamwidth along the geo arc 540 is small enough that the beam can be directly pointed at target satellite 110. The direction of boresight 430 of the beam 422 when using the first operational mode is referred to herein as the target direction. In the illustrated example, the target direction is the actual direction of the target satellite 110. Alternatively, the target direction may be different than the actual direction of the target satellite 110 due to pointing accuracy limitations of the antenna 152.

Figure 5C:
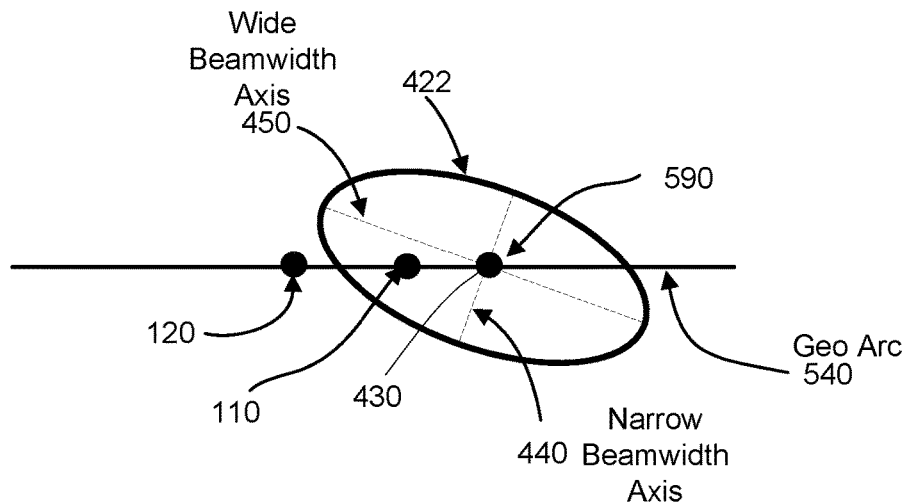
FIG. 5C illustrates pointing of the beam of the antenna for an example geographic location outside the acceptable geographic area for using the first operational mode.

FIG. 5C illustrates pointing of the beam 422 of the antenna 152 for an example geographic location 530 outside the acceptable geographic area 510a, 510b for using the first operational mode. In this example, the geographic location 530 is within the acceptable geographic area 510c, 510d for using the second operational mode. As can be seen in FIG. 5C, boresight 430 of the beam 422 is pointed to an offset direction 590 away from the non-target satellite 120, such that the interference requirements are satisfied. In the illustrated example, the offset direction 590 is in the opposite direction of the non-target satellite 120 along the geo arc 540. In other examples, the offset direction 590 is not along the geo arc 540. For example, the offset direction 590 may be perpendicular to the geo arc 540, or any other direction that reduces the amount of interference with the non-target satellite 120 below the threshold and permits acceptable signal communication with the target satellite 110.

Figure 5D:
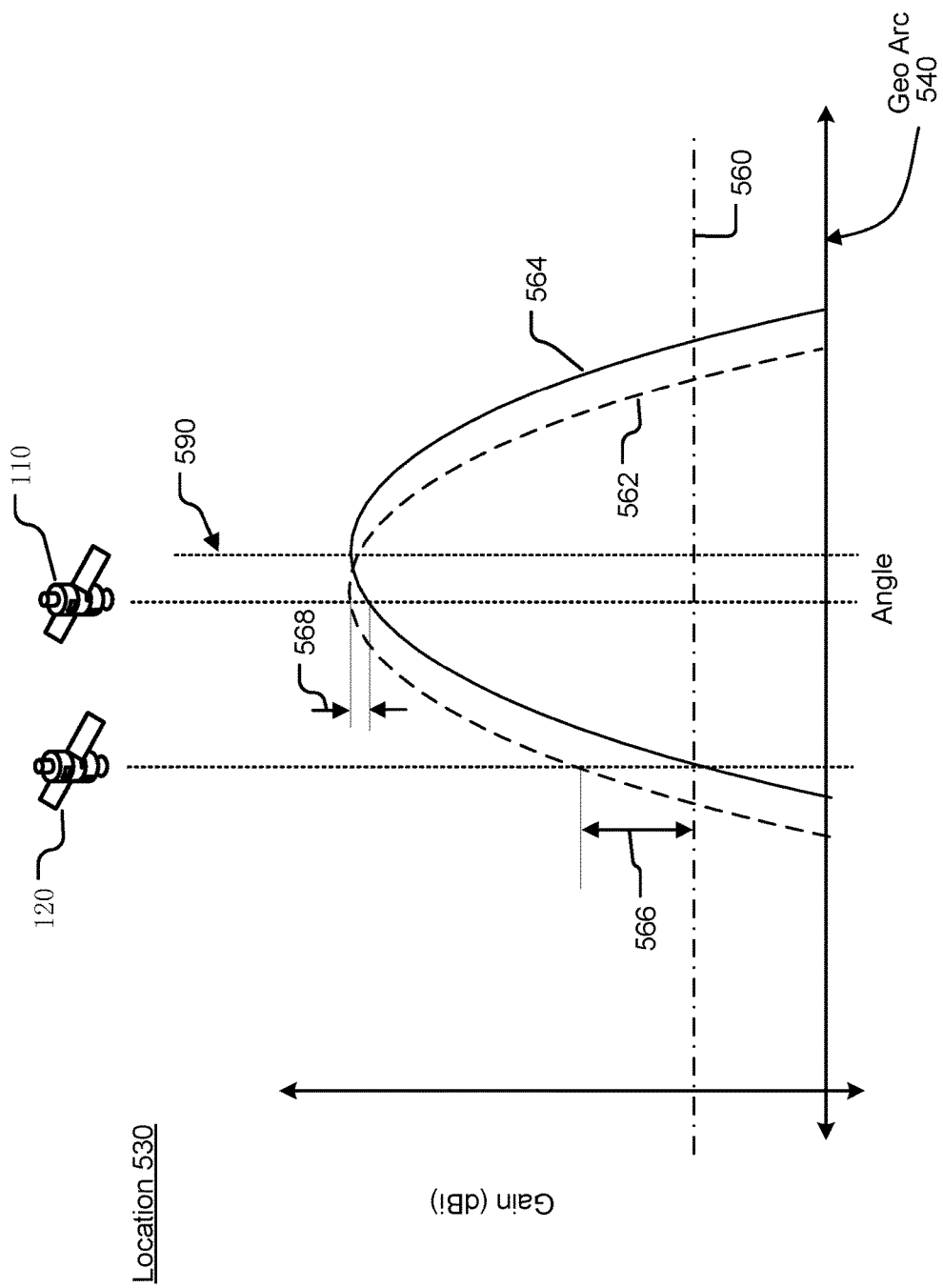
FIG. 5D illustrates a cross-sectional view of the beam pattern of the beam versus angle along the geo arc for the pointing example of FIG. 5C.

FIG. 5D illustrates a cross-sectional view of a portion of the beam pattern of the beam 422 versus angle along the geo arc 540 for the pointing example of FIG. 5C. Line 560 represents the maximum value of the gain in the direction of non-target satellite 120 that satisfies the interference requirement with the non-target satellite 120.

Plot 562 shows what the beam pattern would be if the beam were directly pointed at the target satellite 110 using the first operational mode. As can be seen in FIG. 5D, in such a case the amount of interference in the direction of the non-target satellite 560 would be above the line 560.

Plot 564 shows the beam pattern using the second operational mode of pointing to the offset direction 590. As can be seen in FIG. 5D, by pointing in the offset direction 590, the amount of interference in the direction of the non-target satellite 560 satisfies the interference requirement with the non-target satellite 120. In addition, due to the off-axis gain roll-off of the beam pattern, the reduction 566 in the gain in the direction of the non-target satellite 120 is greater than the reduction in gain 568 in the direction of the target satellite 110. In other words, by pointing in the offset direction 590, the amount of interference in the direction of non-target satellite 120 is decreased by an amount (e.g., 15 dB) that is more than the gain in the direction of the target satellite 110 decreases (e.g., 1 dB). As a result, pointing in the offset direction 590 can have less of a detrimental effect on the link performance with target satellite 110 than other techniques for reducing interference such as reducing the transmit power. For example, if the beam were pointed directly pointed at the target satellite 110 and the transmit power were reduced by an amount sufficient to satisfy the interference requirement, the power in the direction of the target satellite 110 would also be reduced by the same amount. By pointing in the offset direction 590, the power in the direction of the target satellite 110 is reduced by less than that.

Figure 5E:
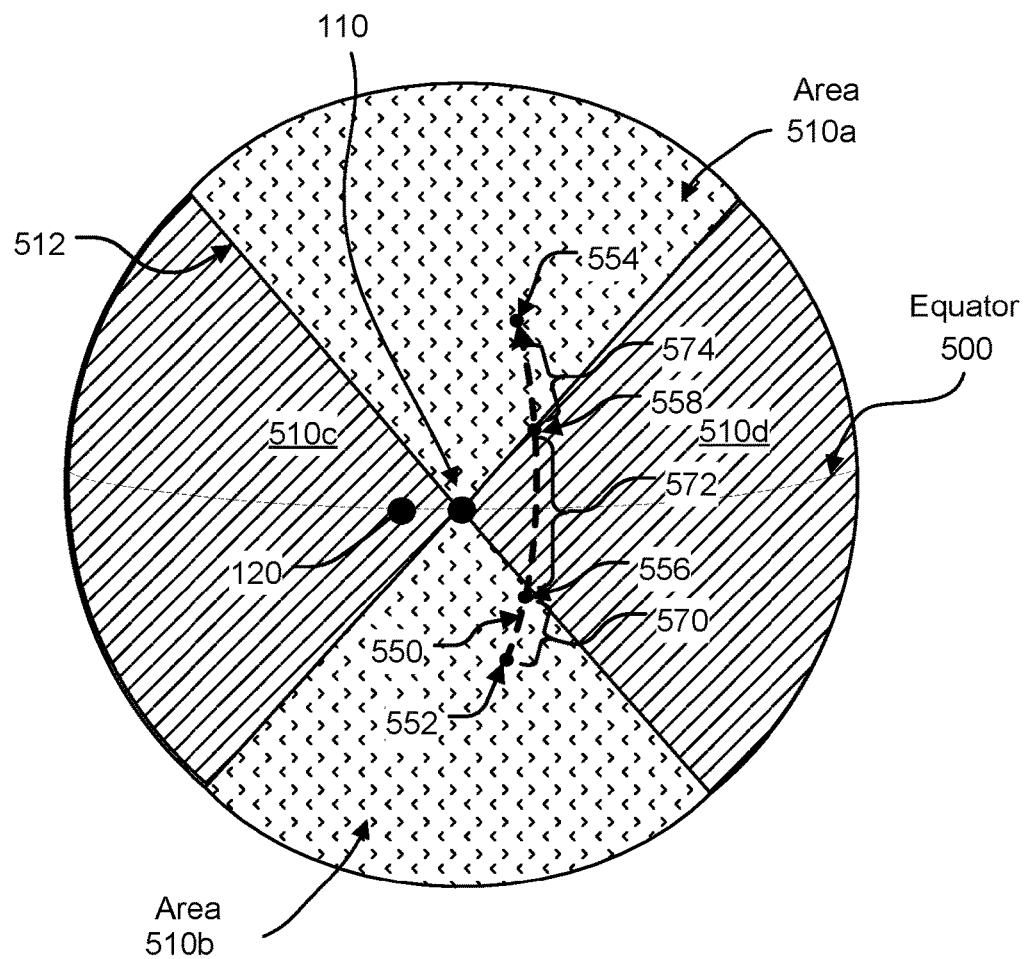
FIG. 5E illustrates a line representing an example flight path for the aircraft on the illustration of FIG. 5A.

When in the second operational mode, the manner in which the offset magnitude and direction changes to adjust pointing of the beam away from the non-target satellite 120 as the aircraft 102 moves can vary from embodiment to embodiment. FIG. 5E is the same as FIG. 5A and includes line 550 representing an example flight path for the aircraft 102 between source 552 and destination 554. At geographic locations along a first segment 570 of the flight path, the aircraft 102 is within the acceptable geographic area 510b for using the first operational mode. Thus, along the first segment 570 the adaptive pointing system 274 operates the antenna system 150 in the first operational mode of directly pointing at the target satellite 110. At geographic location 556 the aircraft 102 leaves the acceptable geographic area 510b of the first operational mode and enters the acceptable geographic area 510d of the second operational mode. Thus, at geographic location 556 the adaptive pointing system 274 controls transition from the first operational mode to the second operational mode, and the antenna system 150 continues to operate in the second operational mode along the segment 572.

At geographic location 558 the aircraft 102 enters the acceptable geographic area 510a of the first operational mode. Thus, at geographic location 558 the adaptive pointing system 274 controls transition from the second operational mode to the first operational mode, and the antenna system 150 continues to operate in the first operational mode along the segment 574 to the destination 554. As described above, the manner in which the adaptive pointing system 274 controls transition between the first and second operational modes can vary from embodiment to embodiment. In some embodiments, the transition is controlled by the value of the offset vector that is provided by the adaptive pointing system 274.

When operating in the second operational mode, the manner in which the adaptive pointing system 274 controls changes in the offset direction as the aircraft 102 moves along segment 572 can vary from embodiment to embodiment. In some embodiments, the offset direction is changed continually by adjusting at least one of the direction and amount of the offset vector to reflect the changes in the geographic location of the aircraft 102. For example, the adaptive pointing system 274 may continuously monitor the current geographic location of the aircraft 102 at a certain rate (e.g., 5 Hz) and provide the appropriate offset vector for that location. In other embodiments, the offset vector is changed on a periodic basis. For example, the adaptive pointing system 274 may periodically obtain the current geographic location of the aircraft 102 and provide the appropriate offset vector for that location.

Figure 6:
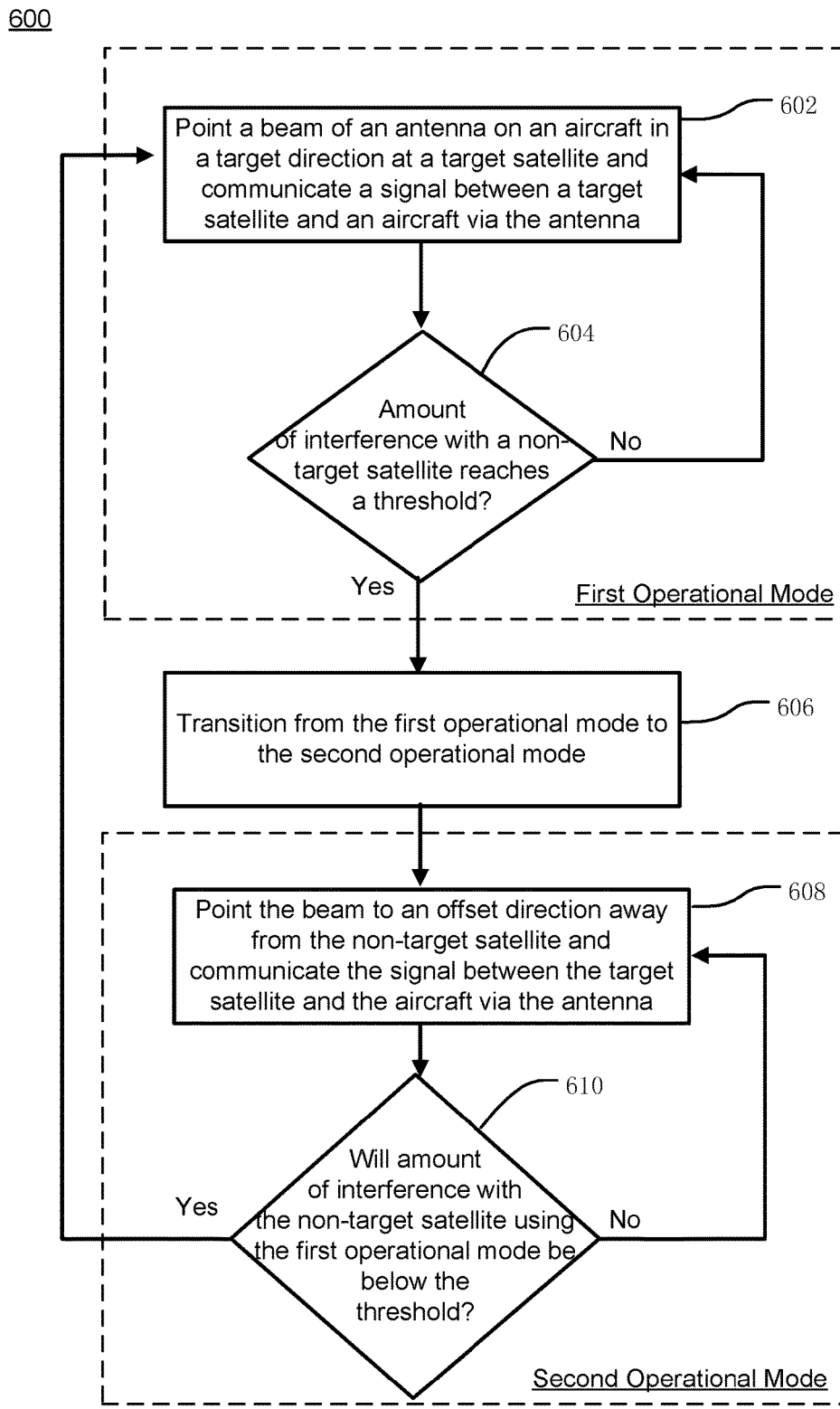
FIG. 6 illustrates an example adaptive pointing operation for pointing the beam of antenna at the target satellite.

FIG. 6 illustrates an example adaptive pointing operation 600 for pointing the beam of antenna 152 at the target satellite 110. Other embodiments can combine some of the steps, can perform the steps in different orders and/or perform different or additional steps than the ones illustrated in FIG. 6.

During step 602, the aircraft 102 is within the acceptable geographic area of the first operational mode. As a result, the adaptive pointing system 274 controls the antenna system 150 to operate in the first operational mode to point the beam of the antenna 152 in the target direction at the target satellite 110. As described above, the target direction of the beam may be different than the actual direction of the target satellite 110 due to pointing accuracy limitations.

Also during step 602, a signal is communicated between the antenna system 150 on the aircraft 102 and the target satellite 110. In embodiments in which the antenna system 150 is in bidirectional communication with the target satellite 110, multiple signals (e.g., forward downlink signal 114, and return uplink signal 116) may be communicated during this step. As the aircraft 102 moves relative to the target satellite 110, the antenna control unit 270 provides the control signal on line 272 to positioner 220 to point the beam in the target direction in order to track the target satellite 110.

At step 604, the determination is made as to whether the amount of interference with the non-target satellite 120 reaches a threshold due to the wide beamwidth axis of the asymmetric beam pattern of the antenna 152. This may for example be done by determining whether or not the aircraft 102 is within the acceptable geographic area of the first operational mode. If not, the operation 600 returns to step 602 and continues to operate in the first operational mode.

If the determination is made at step 604 that the amount of interference with the non-target satellite 120 reaches the threshold, the adaptive pointing operation 600 continues to step 606. In step 606, the adaptive pointing system 274 controls transition from the first operational mode to the second operational mode in which the beam is adjusted to an offset direction away from the non-target satellite 120.

At step 608, the antenna system 150 operates in the second operational mode and further communicates the signal with the target satellite 110. During step 808, the adaptive pointing system 274 may update the offset direction as the aircraft 102 moves.

At step 610, the determination is made as to whether the amount of interference with the non-target satellite 120 using the first operational mode will be below the threshold. This may for example be done by determining whether or not the aircraft 102 has entered the acceptable geographic area of the first operational mode. If not, the operation 600 returns to step 608 and continues using the second operational mode.

If the determination is made at step 610 that the amount of interference with the non-target satellite 120 using the first operational mode will be below the threshold, the operation 600 returns to step 602 and the adaptive pointing system 274 controls transition back to the first operational mode.

In examples described above, the adaptive pointing operations described herein are described in conjunction satisfying the interference requirements of the non-target satellite 120. More generally, the adaptive pointing operations described herein can be used in conjunction with satisfying interference requirements with non-satellite objects, such as celestial sources, terrestrial sources, airborne sources such as aircraft, drones, blimps, etc. Additionally, the adaptive pointing operations described herein may generally be used to satisfy interference requirements in a non-target direction, regardless of whether there is an actual object in the non-target direction.

The methods disclosed herein include one or more actions for achieving the described method. The methods and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

While the present disclosure is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method comprising:
   pointing a beam of an antenna on a mobile vehicle in a target direction at a target satellite and communicating a signal with the target satellite via the antenna, the beam having an asymmetric beam pattern with a wide beamwidth axis and a narrow beamwidth axis in the target direction;
   determining that an amount of interference in a non-target direction reaches a threshold due to the wide beamwidth axis of the asymmetric beam pattern; and
   in response to the determination, adjusting pointing of the beam to an offset direction away from the non-target direction and away from the target direction, and further communicating the signal with the target satellite via the antenna.

2. The method of claim 1, wherein the threshold is a first threshold, and further comprising:
   re-pointing the beam of the antenna in the target direction at the target satellite when the amount of interference in the non-target direction is below a second threshold.

3. The method of claim 1, wherein the offset direction is such that the amount of interference in the non-target direction remains at or below the threshold.

4. The method of claim 3, further comprising changing the offset direction due to changes in geographic location of the mobile vehicle.

5. The method of claim 1, wherein a non-target satellite is in the non-target direction.

6. The method of claim 5, wherein:
   the target satellite and the non-target satellite are each geostationary satellites along a geostationary arc; and
   the adjusting pointing of the beam to the offset direction is based at least in part on a skew angle between the asymmetric beam pattern and the geostationary arc reaching a predetermined value.

7. The method of claim 1, wherein the communicated signal is an uplink signal transmitted from the mobile vehicle to the target satellite.

8. The method of claim 1, wherein the mobile vehicle is an aircraft.

9. An antenna system for mounting on a mobile vehicle, the antenna system comprising:
   an antenna having a beam for communicating a signal with a target satellite, the beam having an asymmetric beam pattern with a wide beamwidth axis and a narrow beamwidth axis;
   a pointing adjustment mechanism to adjust pointing of the beam of the antenna; and
   an adaptive pointing system to control transition of the pointing adjustment mechanism from a first operational mode to a second operational mode in response an amount of interference in a non-target direction reaching a threshold due to the wide beamwidth axis of the asymmetric beam pattern, wherein:
     in the first operational mode, the pointing adjustment mechanism points the beam of the antenna in a target direction at the target satellite; and
     in the second operational mode, the pointing adjustment mechanism adjusts pointing of the beam to an offset direction away from the non-target direction and away from the target direction.

10. The antenna system of claim 9, wherein:
    the threshold is a first threshold; and
    the adaptive pointing system further controls transition of the pointing adjustment mechanism from the second operational mode to the first operational mode in response to an amount of interference in a non-target direction reaching a second threshold.

11. The antenna system of claim 9, wherein the offset direction is such that the amount of interference in the non-target direction remains at or below the threshold.

12. The antenna system of claim 11, wherein in the second operational mode, the adaptive pointing system controls changing the offset direction due to changes in a current geographic location of the mobile vehicle.

13. The antenna system of claim 9, wherein a non-target satellite is in the non-target direction.

14. The antenna system of claim 13, wherein:
    the target satellite and the non-target satellite are each geostationary satellites along a geostationary arc; and
    the adaptive pointing system controls transition of the pointing adjustment mechanism from the first operational mode to the second operational mode when a skew angle between the asymmetric beam pattern and the geostationary arc reaches a predetermined value.

15. The antenna system of claim 9, wherein the communicated signal is an uplink signal transmitted from the mobile vehicle to the target satellite.

16. The antenna system of claim 9, wherein the communicated signal is an uplink signal transmitted from the mobile vehicle to the target satellite.

* * * * *